United States Patent
Richards et al.

(10) Patent No.: US 6,731,097 B1
(45) Date of Patent: May 4, 2004

(54) RECEPTION OF MULTIPLE DATA MESSAGES OVER A TRANSMISSION MEDIUM WITH CONVERSION INTO SUITABLE FORM

(75) Inventors: Neil Richards, East Brent (GB); Gajinder Singh Panesar, Montpelier Bristol (GB); John Carey, Bristol (GB); Peter Thompson, Bristol (GB)

(73) Assignee: STMicroelectronics Limited, Almondsbury Bristol (GB)

( * ) Notice: Subject to any disclaimer, the term of this patent is extended or adjusted under 35 U.S.C. 154(b) by 0 days.

(21) Appl. No.: 09/413,419

(22) Filed: Oct. 6, 1999

(30) Foreign Application Priority Data

Oct. 6, 1998 (GB) .............................................. 9821792

(51) Int. Cl.$^7$ .............................................. H04L 12/56
(52) U.S. Cl. ..................... 320/395.6; 370/412; 370/429
(58) Field of Search .............................. 370/395.1, 412, 370/395.64, 428, 429, 473, 395.6, 395.61, 395.63; 725/131–134, 139–142, 151–153

(56) References Cited

U.S. PATENT DOCUMENTS

| | | |
|---|---|---|
| 3,735,363 A | 5/1973 | Beers et al. |
| 5,274,768 A | 12/1993 | Traw et al. |
| 5,303,302 A | 4/1994 | Burrows |
| 5,398,324 A | 3/1995 | Matida et al. |

(List continued on next page.)

FOREIGN PATENT DOCUMENTS

| | | | |
|---|---|---|---|
| EP | 0 730 362 A2 | 9/1996 | |
| EP | 0 752 796 | 1/1997 | ........... H04Q/11/04 |
| EP | 0 775 958 A1 | 5/1997 | |
| EP | 0 845 918 A2 | 6/1998 | |
| EP | 0 852 450 A2 | 7/1998 | |

OTHER PUBLICATIONS

Standard Search Report dated Mar. 4, 1999.
Standard Search Report dated Mar. 5, 1999.
Standard Search Report dated Mar. 8, 1999.
Standard Search Report dated Mar. 9, 1999.
Standard Search Report dated Mar. 10, 1999.
Standard Search Report dated Mar. 11, 1999.
Tomimitsu Y et al., An ATM Chip Set for High Performance Computer Interfaces, Affording Over 100 MBPS Sustained Throughput, Proceedings of the Custom Integrated Circuits Conf,. May 1–4, 1995 no. Conf. 17, May 1, 1995, pp. 439–442, XP000536839.
Chao, H et al., "A Shared–Memory Virtual Channel Queue for ATM Broadband Terminal Adaptors, Int. Journal of Digital and Analog Communication Systems", vol. 5, Jan. 1, 1992, pp. 29–37, XP000390817.
Mummert, et al., "Fine Grain Parallel Communication on General Purpose LANs", Proceedings of the 1996 Intn'l Conf on Supercomputing, PA, May 25–28, 1996, no. Conf. 10, May 25, 1996 pp. 341–349, XP000683042.

(List continued on next page.)

Primary Examiner—Chau Nguyen
Assistant Examiner—Soon-Dong Hyun
(74) Attorney, Agent, or Firm—Lisa K. Jorgenson; James H. Morris; Wolf, Greenfield & Sacks, P.C.

(57) ABSTRACT

A data reception unit for receiving a plurality of data streams over a data channel. The data streams are received as amounts of data, each amount of data comprising a data portion including data from a data stream and an identity portion identifying that data stream. The data reception unit comprises a data stream memory comprising a plurality of data stream storage areas and a reserve buffer, a first storage information memory for holding first storage information, a processing unit, and a data storage controller. The data storage controller, for each received amount of data, receives the identity portion of the amount of data and performs a storage operation based on the identity portion.

20 Claims, 13 Drawing Sheets

U.S. PATENT DOCUMENTS

| | | |
|---|---|---|
| 5,414,707 A | 5/1995 | Johnston et al. |
| 5,533,020 A | 7/1996 | Byrn et al. |
| 5,533,021 A | 7/1996 | Branstad et al. |
| 5,541,926 A | 7/1996 | Saito et al. |
| 5,544,327 A | 8/1996 | Dan et al. |
| 5,583,561 A | 12/1996 | Baker et al. |
| 5,603,005 A | 2/1997 | Bauman et al. |
| 5,606,559 A | 2/1997 | Badger et al. |
| 5,625,625 A | 4/1997 | Oskouy et al. |
| 5,664,116 A * | 9/1997 | Gaytan et al. ............... 709/234 |
| 5,696,989 A | 12/1997 | Miura et al. |
| 5,708,659 A | 1/1998 | Rostoker et al. |
| 5,726,985 A | 3/1998 | Daniel et al. |
| 5,742,765 A | 4/1998 | Wong et al. |
| 5,748,615 A | 5/1998 | Riedel et al. |
| 5,748,631 A | 5/1998 | Bergantino et al. |
| 5,751,951 A * | 5/1998 | Osborne et al. ............ 709/250 |
| 5,790,544 A | 8/1998 | Aho et al. |
| 5,796,735 A | 8/1998 | Miller ........................ 370/395 |
| 5,815,423 A | 9/1998 | Kim |
| 5,859,856 A | 1/1999 | Oskouy et al. |
| 5,862,312 A | 1/1999 | Mann et al. |
| 5,941,969 A | 8/1999 | Ram et al. |
| 5,953,336 A | 9/1999 | Moore et al. |
| 5,963,543 A | 10/1999 | Rostoker et al. |
| 5,974,496 A | 10/1999 | Miller |
| 5,982,772 A | 11/1999 | Oskouy |
| 6,028,843 A | 2/2000 | Delp et al. |
| 6,034,950 A | 3/2000 | Sauer et al. |
| 6,058,114 A | 5/2000 | Sethuram et al. |
| 6,088,355 A | 7/2000 | Mills et al. |
| 6,119,150 A | 9/2000 | Fujii et al. |
| 6,198,724 B1 | 3/2001 | Lam et al. |
| 6,201,813 B1 | 3/2001 | Klausmeier et al. |
| 6,230,297 B1 | 5/2001 | Bentall et al. |
| 6,262,995 B1 | 7/2001 | Kwak |
| 6,285,675 B1 | 9/2001 | Sakurai et al. |
| 6,295,575 B1 | 9/2001 | Blumenau et al. |
| 6,311,204 B1 | 10/2001 | Mills |
| 6,426,957 B1 * | 7/2002 | Hauser et al. ............... 370/413 |
| 6,466,997 B1 * | 10/2002 | Ross et al. ..................... 710/48 |
| 6,480,499 B1 | 11/2002 | Richards et al. |

OTHER PUBLICATIONS

Hill et al., "Asynchronous Transfer Mode Receiver", IEEE Proceedings E. Computers & Digital Techniques, vol. 139, No. 5 part E, Sep. 1, 1992, pp. 401–409, XP000319888.

Omundsen et al., "A Pipelined, Multiprocessor Arhitecture for a Connectionless Server for Broadband ISDN", IEEE/ACM Transactions on Networking, vol. 2, No. 2, Apr. 1994, pp. 181–191, XP000458372.

HUI Zhang et al., "Comparison of Rate–Based Service Disciplines Computer Communications Review", vol. 21, No. 4, Sep. 1, 1991, pp. 113–121, XP000234931.

* cited by examiner

RECEPTION OF MULTIPLE DATA MESSAGES OVER A TRANSMISSION MEDIUM WITH CONVERSION INTO SUITABLE FORM

FIELD OF THE INVENTION

The present invention relates to the transfer of data, for example the transmission of multiple data messages over a single transmission medium and the conversion of those messages into a form suitable for transmission.

BACKGROUND OF THE INVENTION

There is a growing market in the field of digital communication. An increasing number of households have equipment to receive digital television, satellite and cable television, telephony and internet services. Telephony systems and the internet are interactive systems over which people can send and receive information and other digital communication systems are increasingly tending towards interactivity, for example as video-on-demand systems are introduced.

Video, audio and other information (e.g. internet services), all hereinafter referred to as "data", can be transmitted along a number of transmission media, for example over electrical or optical cable or via radio. The data can be considered to be made up of "messages", each message being, for example, one television channel or one internet connection. To allow a plurality of messages to be sent over a single transmission channel one approach is to split the messages into parts at the transmission device, transmit each part over the transmission channel and then recombine the parts at the receiving device to reconstitute the message. Each message is thus contained in a number of parts, which can arrive at the receiving device over a period of time. Additional information can be transmitted with each segment, for example to indicate the message of which the segment forms part. Consecutively sent messages need not then form part of the same message since the receiving device can use the additional information to allow it to recombine segments of each message with each other.

One system that uses this principle is AAL5. In this system data is transmitted in the form of asynchronous transfer mode (ATM) "cells" of 53 bytes in length, of which the first 5 bytes constitute the additional information mentioned above and the other 48 bytes constitute the segment of the message. By convention each byte consists of 8 bits.

The messages themselves may be split into higher-level parts before they reach the transmission stage: for example video data can be in the form of MPEG frames.

One practical embodiment of a personal system for handling data in this form is a set-top box. This usually receives a digital data feed, forms the received data into digital messages, performs the necessary digital-to-analogue conversion and final backend processing of the messages and outputs signals suitable for use by other apparatus such as televisions, telephones or internet terminals. There is also normally provision for transmission of information (normally at a lower data rate) in the opposite direction to allow a user to operate interactive services. The reverse data can conveniently, although not necessarily be sent in the same format as the forward data.

In order to meet the demands of consumers for high data rate services such as video a set-top box should preferably be capable of receiving and transmitting at a rate of at least 1 to 10 Mbits/s and preferably of receiving at least 50 Mbits/s. This imposes very heavy demands on the processing systems that are to perform the transmitting and receiving operations, especially the segmentation of messages into parts and the reassembly of those parts. Since the set-top box is intended as a consumer product there is a particular need to provide a device for performing the transmitting and receiving operations that is as inexpensive as possible.

There are known integrated circuit systems that can perform the segmentation and re-assembly ("SAR") functions described above for use in a personal system. Current systems fall generally into two categories, having the following characteristics:

Hardware-based designs
  Very fast dedicated SAR engines (typically 155/622 Mbits/s)
  Large silicon areas
  Expensive, and although they are hardware-based systems they often still require a microprocessor for control purposes
  Complicated control registers and memory management data structures defined in hardware
  Inflexible, which makes it difficult to adapt them to rapidly evolving new standards and markets
Software/Processor-based designs
  Relatively slow (usually sub 20 Mbits/s)
  Can be inexpensive with cheap RISC (reduced instruction set computing) processors, but become uneconomic in embedded situations at high data rates (40–50 Mbits/s upwards) because expensive high performance processors are needed
  Flexible, as all control and data structures are software-defined, so easier to modify as standards evolve In fact, there are four conflicting design requirements which need to be met for widespread consumer use:

Cost Targets. To a large extent the cost of an integrated circuit SAR engine is determined by the complexity of the circuit and the die area it occupies. Known hardware-based systems generally occupy large areas and whilst low-cost RISC software-based systems are cheaper to produce, their performance is modest.

Flexibility to meet evolving standards. Hardware-based systems are generally inflexible.

Performance targets. Existing hardware-based solutions have high performance but are too expensive for many consumer applications. Existing software-based solutions are cheaper but have modest performance.

Ease of Interfacing to other parts of the system

It is clear from the above analysis that the SAR engines currently available do not provide an effective technical and cost-effective solution.

SUMMARY OF THE INVENTION

According to a first aspect of the present invention there is provided a data reception apparatus for receiving data from a plurality of data streams sent over a data channel, the apparatus comprising:

a data memory for storing the received data;

a data storage control memory for storing, for each data stream, a definition of a corresponding storage block in the data memory, the storage blocks for the respective data streams being capable of being of different lengths;

a data storer for identifying in the data received on the data channel amounts of data and the data stream from which each amount of data is sent, accessing the storage control memory to determine the storage block corresponding to the said data stream, storing that amount of data in the storage block corresponding to the said data stream and, if no more amounts of data can be stored in that storage block, generating a block full indication for that block; and a memory controller responsive to a block full indication for a storage block to allocate to the data stream corresponding to that storage block another storage block in the data memory by storing, for that data stream, a definition of the other storage block in the data storage control memory.

Preferably the data storer is provided by dedicated circuitry on an integrated circuit. Preferably the memory controller is provided by the central processing unit of an integrated circuit. Preferably the data storer and the memory controller are provided by separate processing circuitry on a single integrated circuit.

At least part of the data memory is preferably on the integrated circuit. The integrated circuit may include memory.

At least some of the storage blocks are preferably contiguous sets of memory locations. At least some of the blocks may alternatively not be contiguous.

Preferably the storage block comprises an end memory address and the length of the storage block. Preferably the storage blocks are of differing sizes. Preferably the differing sizes of the storage blocks are programmable under software control by the central processing unit and/or dynamically changeable during operation of the apparatus.

The data storage control memory preferably stores error check information for at least one of the data streams and on receiving an amount of data from that data stream the data storer performs an error check calculation using the stored error check information and the contents of the amount of data to calculate second error check information and stores the second error check information in the data control memory to replace the first error check information.

The data storer preferably generates the block full indication after receiving an amount of data that can not be stored in the storage block. Preferably if the data storer determines that an amount of data can not be stored in the storage block and that that amount of data is a final amount of data of a message it generates a block full indication of a second type, in response to which the memory controller allocates a smaller storage block for the data stream.

The memory controller preferably maintains a list of storage blocks available for allocation.

The data storage control memory preferably stores for each data stream an indication of a location in the data memory at which the data storer is to store the next-received amount of data for that data stream.

The data memory is preferably provided by at least two discrete memory units.

Each amount of data is preferably received in the form of an ATM cell. The amount of data is suitably 384 bits.

According to a second aspect of the present invention there is provided a method for receiving a plurality of data streams over a data channel, the method comprising performing the steps set out above in relation to the first aspect of the invention.

The present invention will now be described by way of example with reference to the accompanying drawings in which:

BRIEF DESCRIPTION OF THE DRAWINGS

In the figures like reference numerals indicate like parts.

DESCRIPTION OF THE PREFERRED EMBODIMENTS

Basic System Architecture

Figure 1:
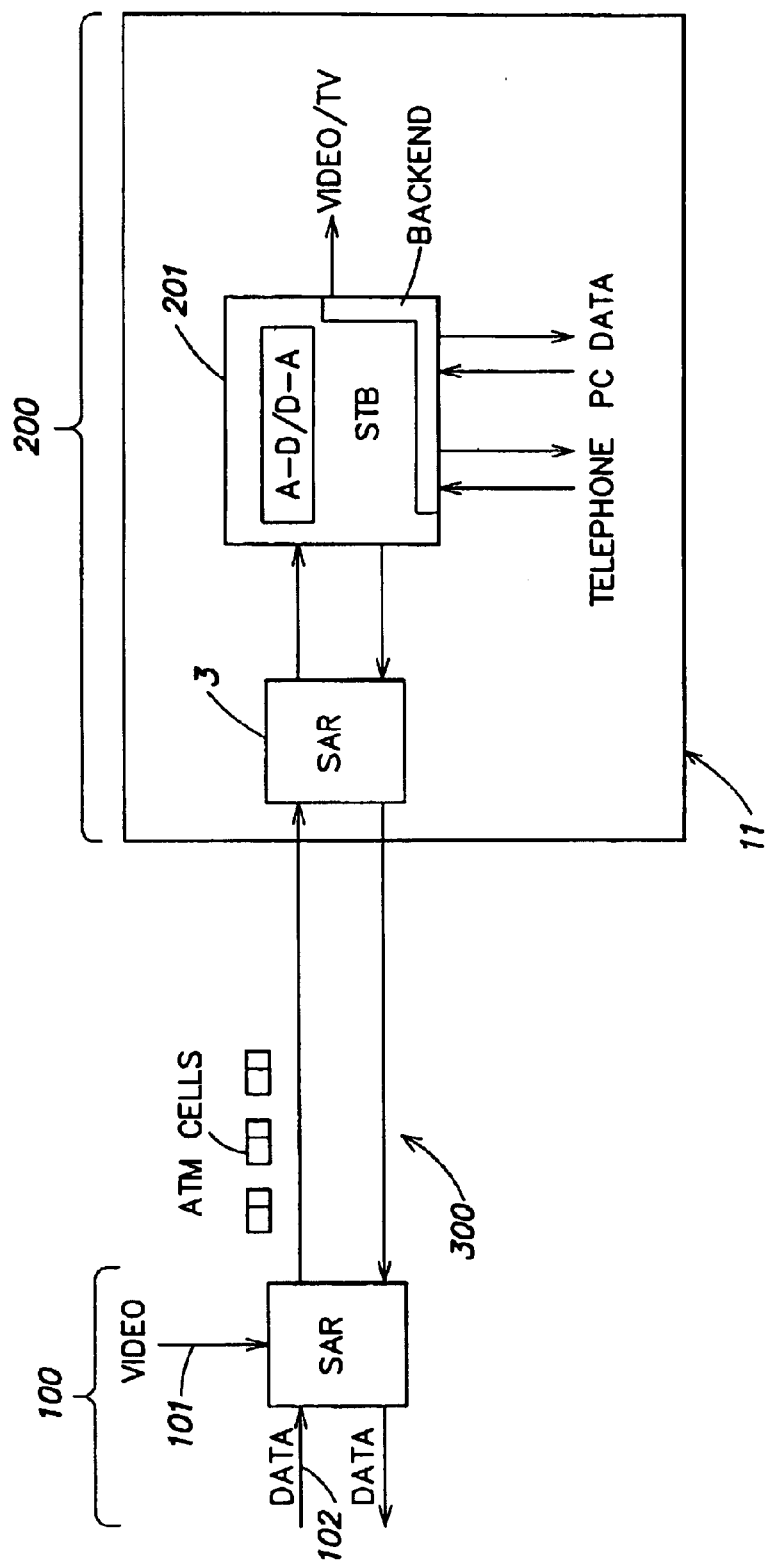
FIG. 1 shows a simple schematic diagram of the functions performed over the network system and at the user end

FIG. 1 shows an overall schematic view of a system for transmitting and receiving data. The system comprises a network end shown generally at 100, a terminal end shown generally at 200 and a bidirectional communications link 300 (which could, for example be provided by a telephone network, a dedicated cable connection or a radio link) between the two ends. Incoming video and other data streams 101, 102 are segmented at the network end and transmitted along the link 300 as ATM cells. These cells each contain a part of a message and have cell content information prepended to them. This cell content information indicates (among other things) which message the cell forms part of. When the cells arrive at the terminal end 200, which in this example is a personal system 11, they are re-assembled in the SAR engine 3 and sent to an STB data processing unit 201. This converts the messages into a form suitable for outputting to other equipment: for example, by converting MPEG frames into an analogue PAL television feed. From the STB unit 201 the messages are sent to the appropriate output device. Data from a controller or from a personal computer, for example, is received at the STB unit, which converts the received data into a message in a digital form suitable for input to the SAR engine 3. The SAR engine then breaks this message into segments, adds cell content information to each segment to form an ATM cell and then transmits the cells over the communications link 300. The two ends also exchange link control information, for example to negotiate the data rate over the link, in the form of ATM cells. It will be appreciated that the use of an STB unit is merely an example according to this embodiment; one possible alternative is in an internet adapter card.

In the personal system each message or data stream is considered to constitute a virtual channel (VC).

Figure 2:
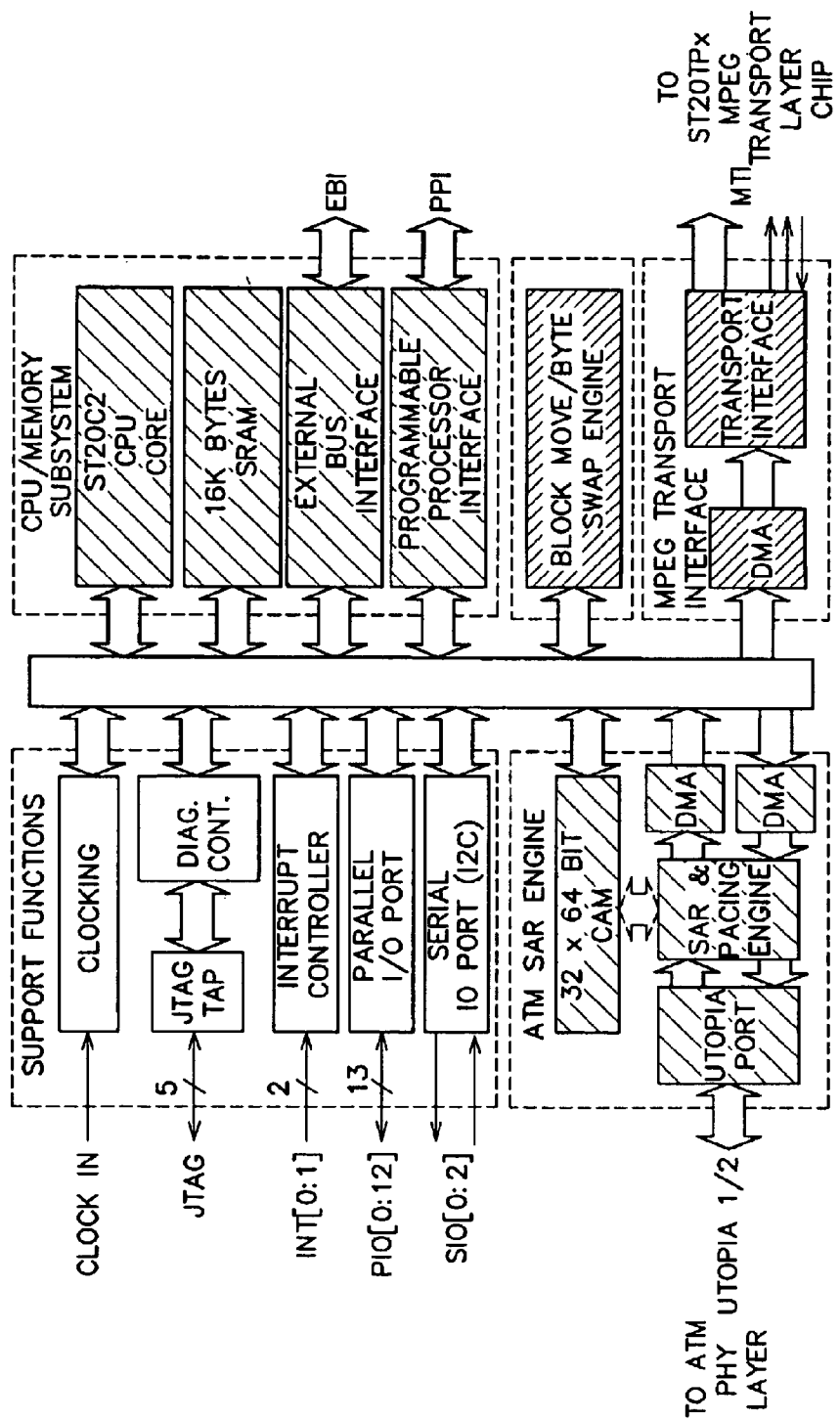
FIG. 2 shows the general architecture of the SAR engine integrated circuit
Figure 3:
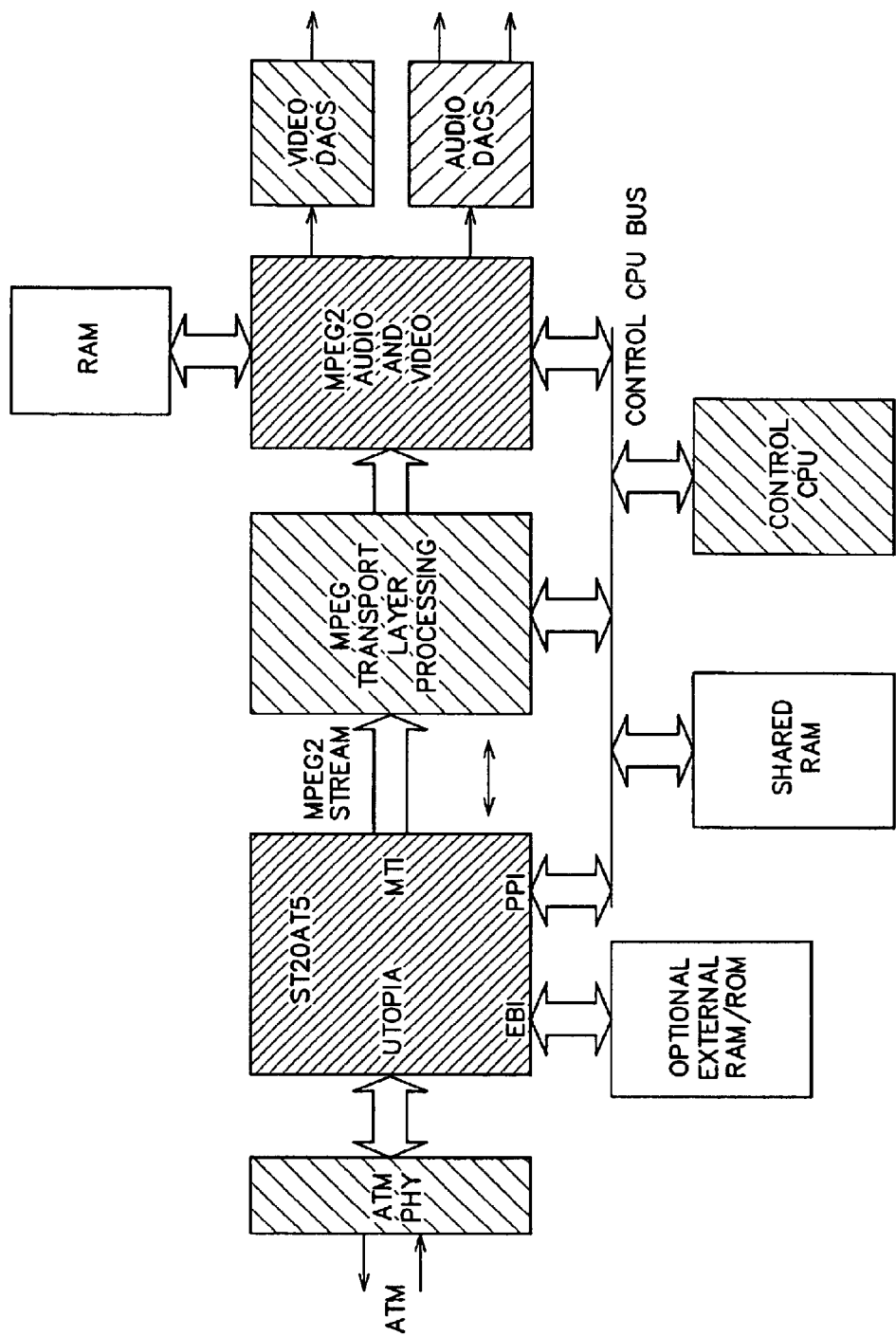
FIG. 3 shows the function of the SAR engine integrated circuit

The SAR engine is provided on a single integrated circuit, together with other units including memory and a CPU. The general architecture of the integrated circuit is shown structurally in FIG. 2, and more functionally (together with links to off-chip RAM, the ATM physical interface and MPEG transport back end) in FIG. 3.

Overview of the Function of the SAR Engine

The SAR engine performs the following basic functions:
Segmentation of outgoing ATM VCs from memory
Reassembly of incoming ATM VCs into memory The memory that is used for these functions could be on or off the chip on which the SAR engine is provided, or both types of memory could be used together—for instance some messages could be held in on-chip and some in off-chip memory. Because of the high data rates used for video it is preferred that on-chip memory is used for video VCs.

Figure 4:
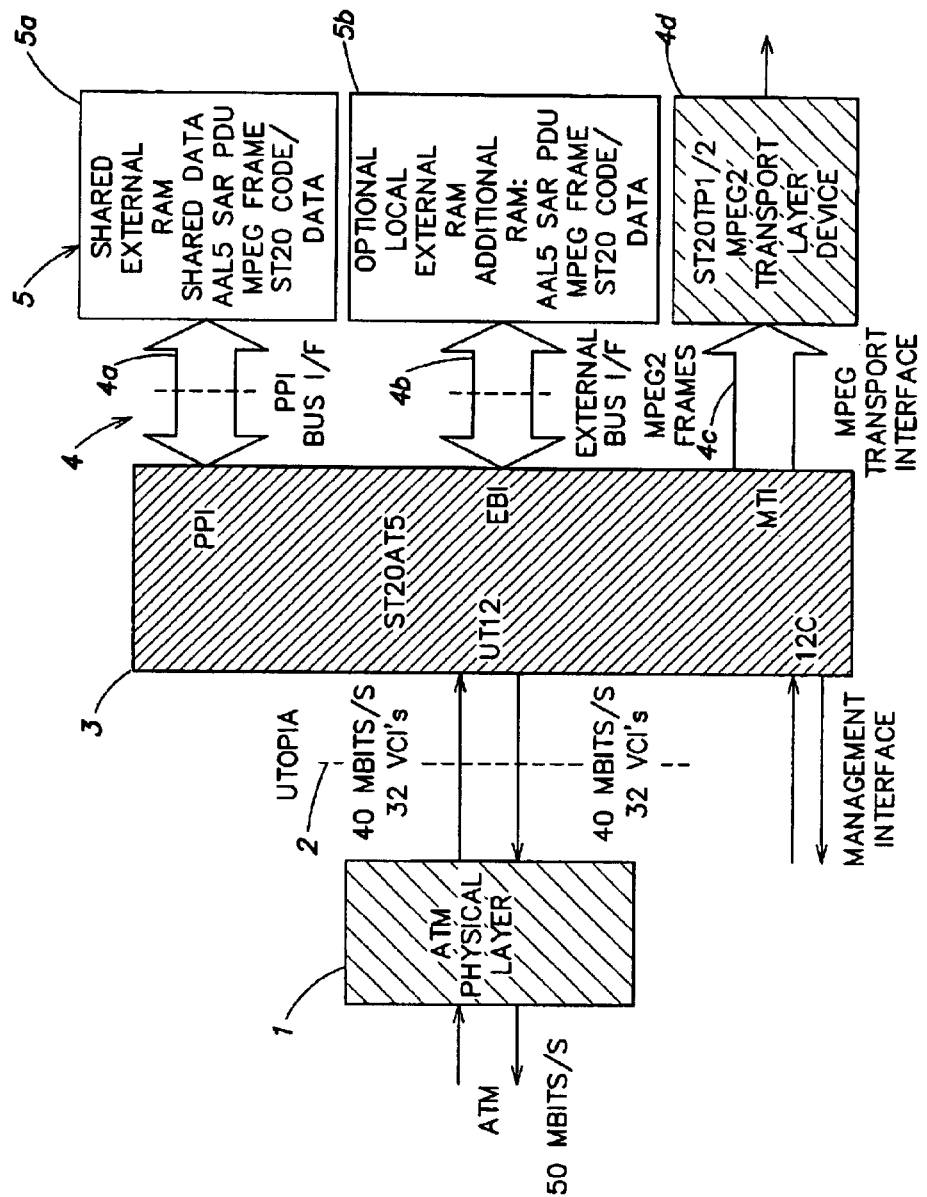
FIG. 4 represents the interfaces to the present SAR engine

The local environment of the SAR engine of an embodiment of the present invention is shown in FIG. 4, including its key interfaces and their bandwidths. This diagram shows part of the personal system 11 indicated in FIG. 1. The arrival and departure of the ATM cells can be represented by the ATM Physical Layer 1. In this embodiment, the rate of data arrival is 40 Mbits/s and the system is able to deal with 32 channels at a time (i.e. 32 messages) in each direction. The cells are interfaced with the SAR engine 3 via a UTOPIA port 2 which implements a standard UTOPIA interface. At the other side of the SAR engine, there is a bus system 4 which allows transfer of data to the appropriate external memory 5. Two forms of external memory can be provided, namely shared RAM 5a, which is shared with other control functions in the STB, and optional RAM 5b. Shared RAM 5a can be used as a buffer for control information and signalling (channel) data, and it can be accessed by the SAR engine via a Programmable Processor Interface (PPI) 4a. The optional RAM 5b, is accessed by the SAR engine via an external bus interface 4b, and can be used in configurations where additional memory is needed, for example in environments where a high level of jitter is experienced. The SAR engine places MPEG frames in memory, from where they are fed via a dedicated MPEG video output 4c to an MPEG transport layer device 4d.

All or part of the external memories could be provided on the integrated circuit of the SAR engine.

The SAR engine implements encoding and decoding of data according to the AAL5 standard. The implementation of the AAL5 function for both MPEG2 frames and signalling and control frames is split, with CPCS/SSCS functions for signalling/control frames performed in software and functions for MPEG2 frames in hardware.

The functions of the SAR engine will now be described in more detail.

ATM Cell Reception and AAL5 SAR-PDU Reassembly

Figure 5:
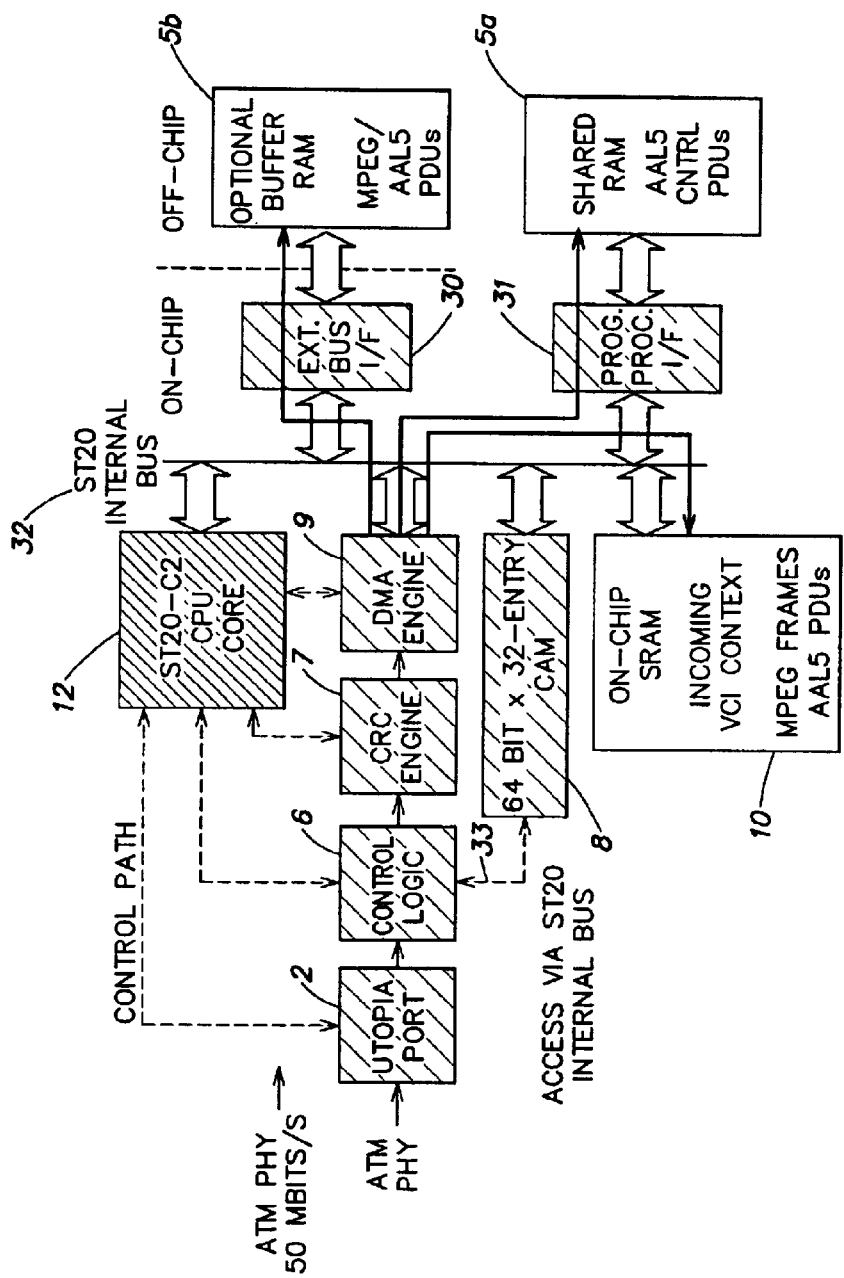
FIG. 5 shows the reassembly architecture and data flow

FIG. 5 shows the on-chip architecture of the SAR engine in more detail.

Incoming data is received from the ATM physical layer 1 at port 2. The UTOPIA port 2 performs an error check on four bytes of the ATM cell header by calculating a check, such as a CRC, and comparing that with the HEC (header error check) word in the fifth byte. The UTOPIA port can be configured by the CPU to either reject or pass through cells whose headers contain an error.

The "front-end" hardware of the reassembly function comprises one or more state machines, namely a control logic unit 6, a cyclic redundancy check (CRC) unit 7 for implementing the AAL5 CRC processing, a content addressable memory (CAM) 8 and a DMA engine 9. These functions are shown logically in FIG. 5, but it should be understood that this does not necessarily correspond with the physical structure.

An on-chip context memory 10 is provided as an SRAM and is used to store context information for the incoming data stream. The context information is made up of a set of data for each message channel that is to be received, indicating information that is to be used in reassembling the ATM cells. If a cell is received with header information which does not correspond to stored context information, a signal can be sent to the processor 12 to allow the processor to handle the cell itself, or the cell can be discarded, depending on the configuration of the device. It will be appreciated by those skilled in the art that the context memory 10 could alternatively be provided off-chip.

A processor 12, which in this case is an ST20-C2 processor, can control and receive information from the UTOPIA port 2, the control logic 6, the CRC engine 7 and the DMA engine 9 by means of respective control paths. The processor 12, the DMA engine 9, the CAM 8 and the context memory 10 are linked to each other and to external bus interfaces 30, 31 by an internal data bus 32. External local bus interface 30 provides an interface to off-chip memory 5b. External shared bus interface 31 provides an interface to off-chip memory 5a shared, for example, with an optional external control CPU.

Figure 6:
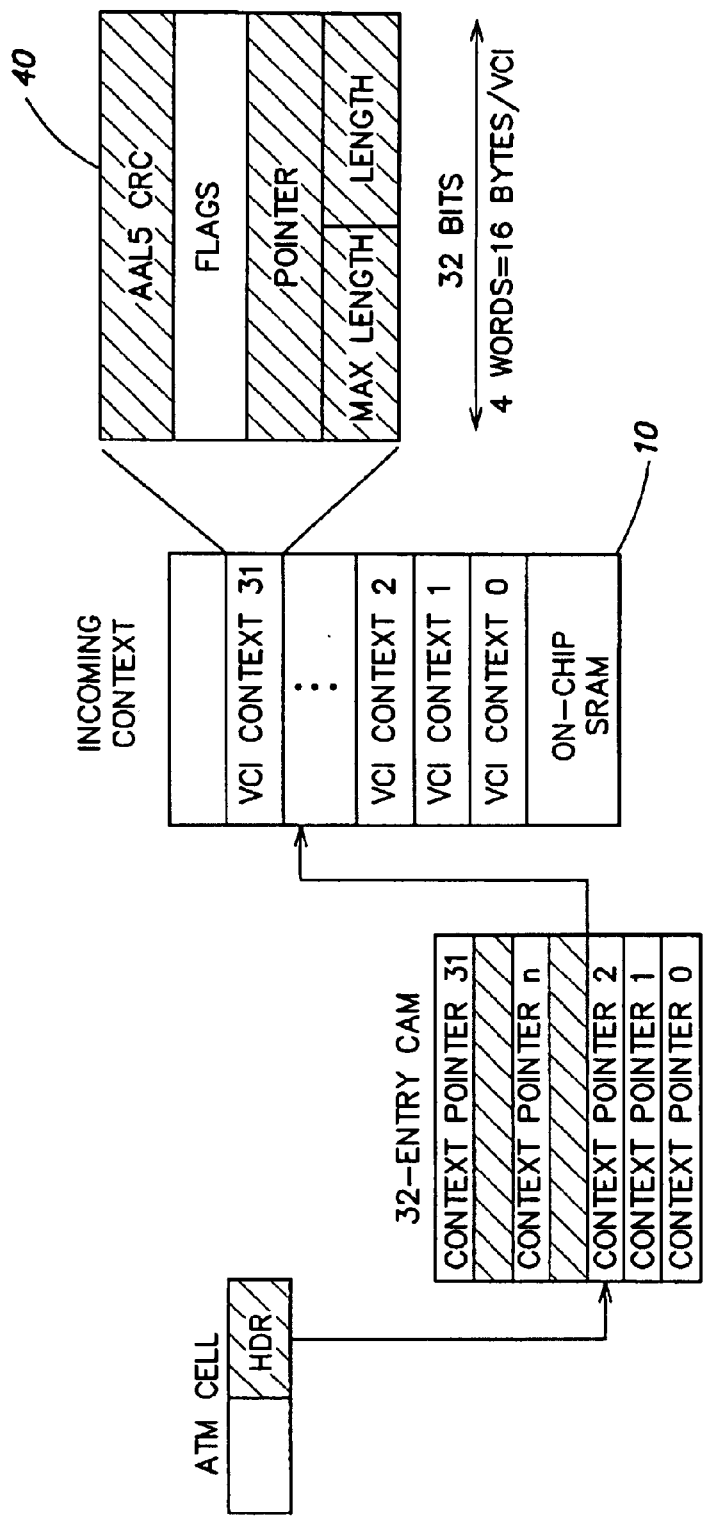
FIG. 6 shows a detail of the Context Memory system used during reassembly

In operation the CAM 8 and the context memory 10 are set up under the control of the processor 12, using the internal bus 32, to hold information needed to reassemble each message channel that is to be received. The processor allocates a block of memory in the context memory 10 to hold context information for use in reassembling cells of that message. The processor also allocates storage buffer memory, either in the memory 10 or in another memory (for example off-chip memory) to receive the incoming data. In the allocated block in the context memory 10 the following information, which is illustrated at 40 in FIG. 6, is held:

a 32-bit pointer to the position in the storage memory where incoming data is to be stored;

a value for a running CRC;

flags a 16-bit maximum length of the PDU (protocol data unit) that is to be received;

a 16-bit current length of the PDU indicating how much of the PDU has so far been received.

Other numbers of bits could be allocated to each field, depending on the implementation. The processor stores initial values for each of these fields into the allocated block in the context memory.

32 sections are available in the context memory 10, each corresponding to one of the 32 receive channels that can be handled in hardware. Therefore, in the present embodiment 32 incoming channels can be processed by the basic reassembly mechanism without the need for extra processor support. By extending or re-using the context memory with additional support from the processor, more channels can be processed. The system also provides exception mechanisms for handling these further channels that are described in more detail below.

The ATM header information (including the VCINPI for the cell) is extracted by the control logic 6 and applied to the CAM over an internal bus 33. The bits of the header that are not relevant to the CAM are masked out under the control of initialisation software. The CAM is a 64 bit×32 entry CAM. The CAM indicates whether the cell header matches any of the cell headers in the CAM by returning the number of the entry in the CAM where the match occurs. The blocks in the context memory begin at evenly spaced memory addresses so by multiplying the returned entry by the spacing and adding an offset the control unit returns the start address of the appropriate block in the context memory 10. Alternative ways of deriving the start address—such as look-up tables—could be used instead.

If there is no match for the VPINCI in the CAM then depending on the configuration of the device one of the following four methods may be used:
1. The cell is simply discarded.
2. A signal is sent to the processor 12 (e.g. by means of an interrupt) to indicate that there is no match for the current cell. The signal itself could give the identity of the message from which the cell comes, or the processor could access the cell directly to determine that. The processor then decides whether the cell is one that is desired to be received. If it is then the processor determines a block in the memory where that message can be or is being stored, configures a block in the context memory if one does not already exist for the message and an entry in the CAM accordingly and then signals the SAR unit to repeat its attempt to process the cell as normal. In the meantime the SAR engine could have been suspended waiting for the signal from the processor or could have been processing other cells, with the unmatched cell held in a reserve buffer. If the processor determines that the unmatched cell is not wanted then it could signal the SAR engine to discard the cell. This method allows the processor to configure the SAR unit to perform efficient hardware-based reception of a data stream that is expected to be received frequently.
3. A signal is sent to the processor (e.g. by means of an interrupt) to indicate that there is no match for the current cell. The signal itself could give the identity of the message from which the cell comes, or the processor could access the cell directly to determine that. The processor then decides whether the cell is one that is desired to be received. If it is then the processor determines a block in the memory where that message can be or is being stored, configures a block in the context memory if one does not already exist for the message and then applies to the SAR unit the information that would be expected to be received directly or indirectly from the CAM to indicate that that context is to be used (e.g. an entry number other than an integer from 1 to 32, or the start address of the context to be used), which signals the SAR unit to repeat its attempt to process the cell as normal. In the meantime the SAR engine could have been suspended waiting for the signal from the processor or could have been processing other cells, with the unmatched cell held in a reserve buffer. If the processor determines that the unmatched cell is not wanted then it could signal the SAR engine to discard the cell. This method allows the processor to control the SAR unit to make efficient use of more contexts than can be supported by the 32 entries in the CAM.
4. The SAR unit accesses a register (e.g. in the internal RAM) that gives the location of a buffer for unmatched cells. The cell is stored at that location together preferably with its header information (or other data) to indicate the message from which the cell comes. The register is then incremented to give the address of the next location in the buffer to receive unmatched data. The processor can then, in parallel with the subsequent operations or the SAR unit, process the contents of that buffer to reassemble messages or discard cells from the buffer in software. The processor could be signalled by the SAR unit or by other means when the buffer is half or more nearly full (e.g. by comparing the location stored in the register with the value of a trigger location stored in another register) or the processor could itself periodically check on the buffer. When the processor has taken the data from the buffer it can reset the location register to allow the buffer to be refilled. This method allows the unit to support processing of unmatched cells with very little interruption and consequent slowing of normal operation. The buffer for unmatched cells could be just one cell in size or larger, for example 20 cells or more in size. If the buffer were one cell in size then the SAR unit should preferably signal the CPU immediately, for example by means of an interrupt, when a cell was placed in the buffer to allow the processor to handle the cell promptly.

In any of the cases the SAR unit can (depending on configuration) signal a no-match exception to the CPU. Methods 2, 3 and 4 provide useful ways of extending the capabilities of the system beyond the limitations of the size of the CAM, which can allow the system to combine the benefits of quick dedicated processing of cells with the benefits of flexible software-based processing and without calling for a larger and more expensive hardware CAM.

If there is a match in the CAM then the 48 data bytes of the received ATM cell are applied to the control logic 6. The control logic 6 accesses the context memory at an address offset by 64 bits from the start address to obtain the pointer stored there. The pointer indicates the memory location in a RAM 5 where the data is to be stored. The control logic 6 writes this pointer to the DMA engine 9, and checks the memory location. The DMA engine then stores the 48 bytes of data from the cell at that location.

Once the DMA engine 9 has stored the data, the control logic 6 increments by 48 bytes the pointer in the context identified by the start address. This allows the next piece of data of the same message to be stored in the correct subsequent location. The control logic 6 also increments the length in the context identified by the start address by 48 bytes, for use in memory management as described below. It will be appreciated by those skilled in the art that by simple changes to the system, other cell sizes could be processed, and the incrementing of the pointer and length information altered accordingly.

Figure 7:
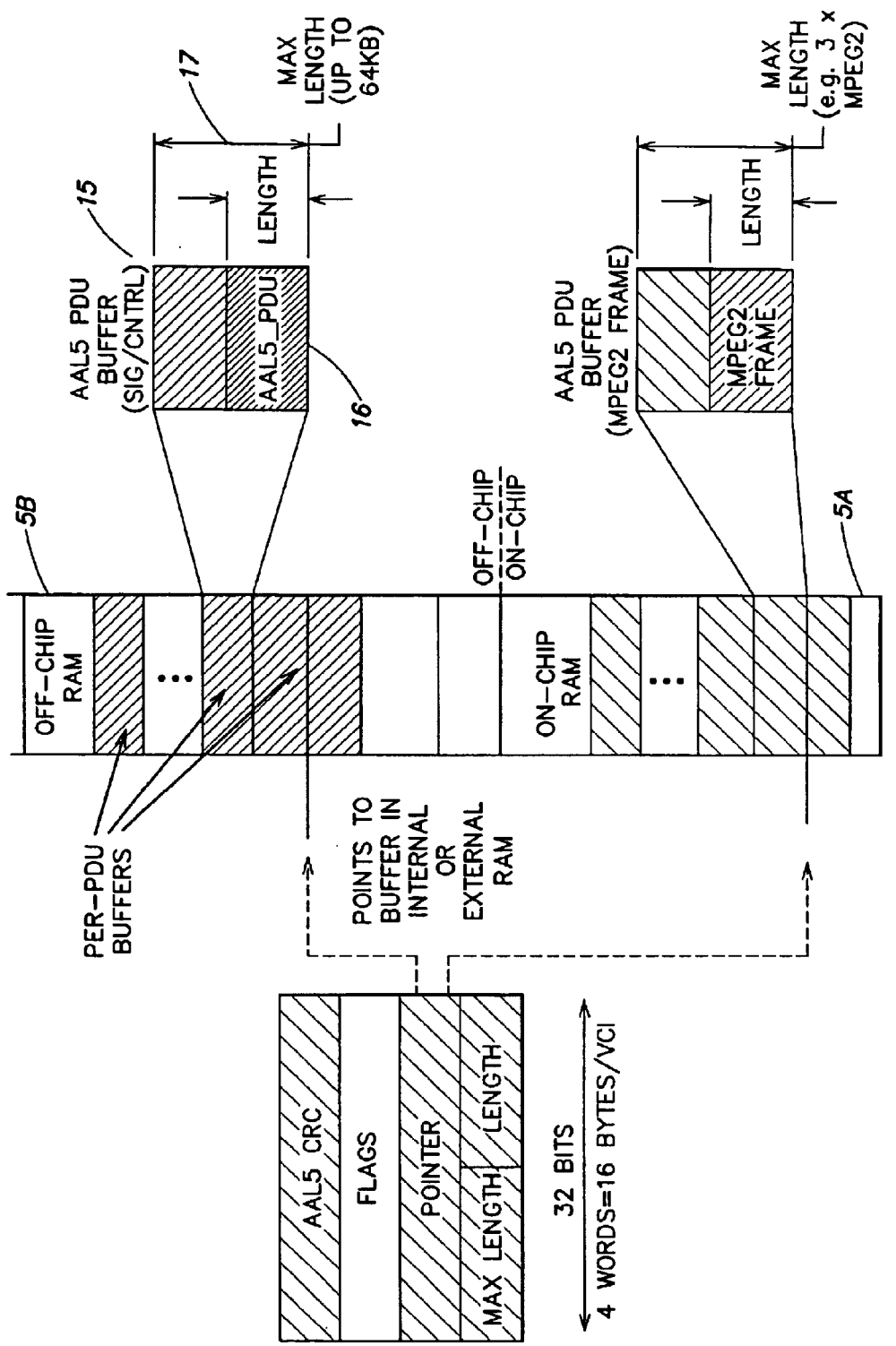
FIG. 7 shows the reassembly buffer organisation

The address range into which the pointer falls determines whether the cell is written into the internal SRAM or the external RAM, as illustrated in FIG. 7. In this embodiment, typically video information is stored in an on-chip memory 5a and other data is stored in an off-chip memory 5b. The device can be configured to support other storage arrangements. In this figure, the data stored in one area of a RAM (for one message) is indicated as 15. At this point in time, the amount of the particular message which is stored is indicated by the shaded area sized as "length" 16 and the maximum available space ("maximum length") is indicated as 64kbyte 17.

The last cell in the PDU is indicated as such by information in its ATM header. If the system is configured to do so, reception of this cell triggers the special action of checking the CRC stored in the context memory for the entire message against the CRC transmitted in the last cell. If the two do not match then the CRC fails and an error is signalled to the CPU 12; otherwise a 'PDU complete' indication is signalled to the CPU, if this function is enabled.

Jitter Handling

In normal use the ATM cells can be expected to arrive irregularly, at variable time intervals. Once the cells have been combined, for example into MPEG frames, it may be desirable for them to be sent out of the apparatus at more regular intervals. If, for example, they are MPEG frames carrying video information, time delays (jitter) between them in the middle of a message would produce a problem when actually viewing the channel. Therefore, the SAR engine includes jitter handling software which can be enabled for passing the cells at more regular intervals to the reassembly apparatus or for passing assembled frames of cells at more regular intervals to downstream equipment such as video decoders. The cells/frames are received and stored in a buffer memory, which may be as already described. A signal is sent to the CPU indicating which cells/frames are stored, and the CPU executes instructions to determine the time at which the next cell/frame needs to be transferred. At that time it informs access software of the location in the buffer memory from which to take the next cell/frame, and the access software can then retrieve the cell/frame and transmit it to downstream apparatus. In this way, real-time delays or irregularities in the relevant stream of data are prevented, minimised or at least reduced. An advantage of this particular invention is that this process is all done in software. This allows fully flexible control over the de-jittering operation and particularly in combination with fast hardware-based reassembly of the received cells can substantially minimise jitter and allow only a relatively small buffer (which may already be used for reassembly) to be needed for de-jittering.

Memory Management

For ease of management of the memory system, a software-based memory management scheme is supported. This gives a substantial advantage over prior art systems in terms of flexibility and cost. In certain cases, the PDU segmentation and reassembly buffers may be made deliberately smaller than the maximum PDU length (64 k bytes for the AAL5 protocol being used) in order to optimise use of memory. For example, to support 32 VCs in each direction with a 64 kbyte buffer length for each PDU would require 4 Mbytes of memory. Most of this is likely to be unused at any time since typically much of the AAL5 traffic is likely to be with much shorter frames than this. In low cost STB applications this is an unacceptable cost overhead, so a more intelligent use of buffer memory is required.

This situation is more likely to occur for the signalling PDUs being delivered to the external control processor, which could be of any length (up to the maximum 64k bytes) and which will be segmented or reassembled to/from the (relatively expensive) shared memory space. It should not normally be expected to occur for MPEG2 frames because of the small, fixed size of the buffers needed (e.g. 2×188 bytes).

Figure 8:
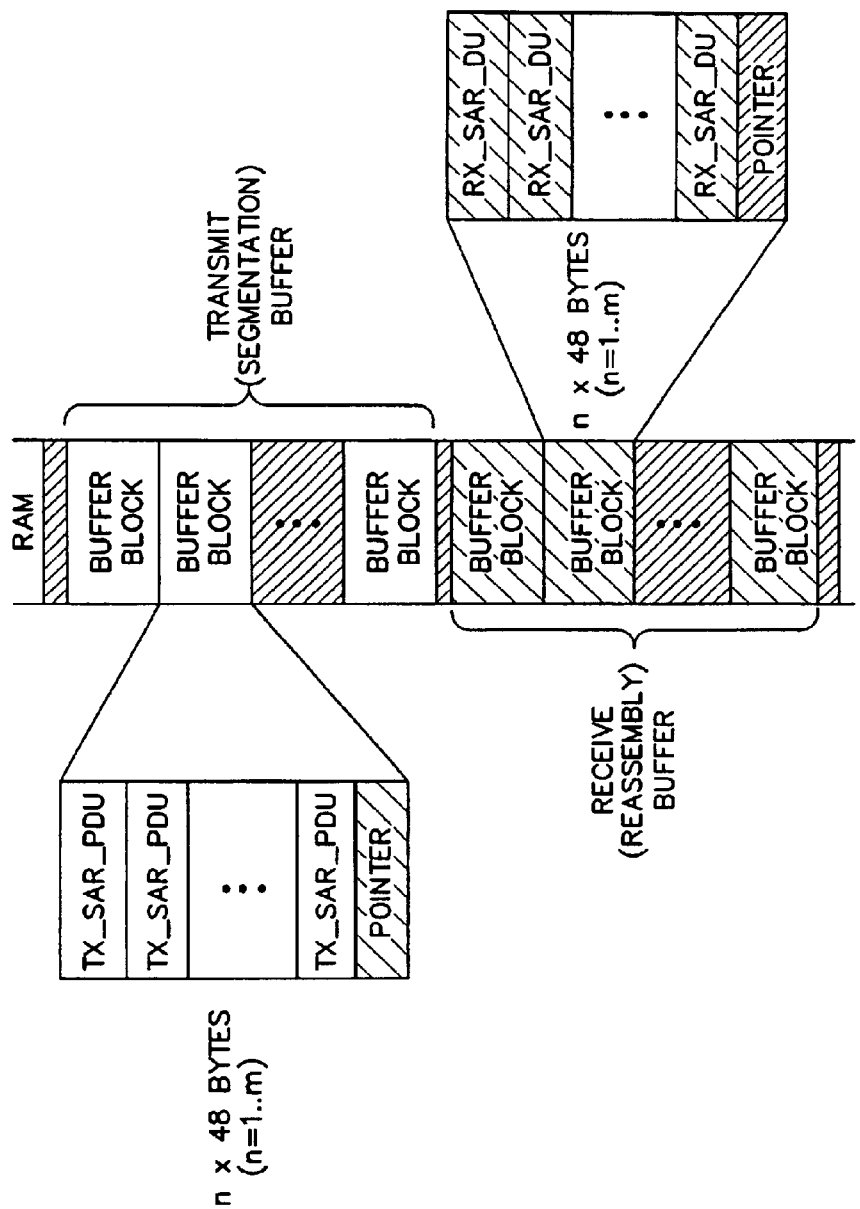
FIG. 8 shows the structure of the buffer memory in hardware

The SAR engine hardware therefore provides certain support functions to the CPU to enable a number of different memory management schemes to be implemented in software. FIG. 8 illustrates the structure of the memory in hardware where the received data and data to be transmitted is stored. It comprises a reassembly buffer area and a segmentation buffer area, each of which is divided into a number of buffer blocks for storing PDUs from a particular message. The buffer block allocation is performed in software, which provides the advantage that the hardware can be kept simple, because it simply has to signal to the CPU when it runs out of buffer but does not have to perform the allocation itself.

Figure 9:
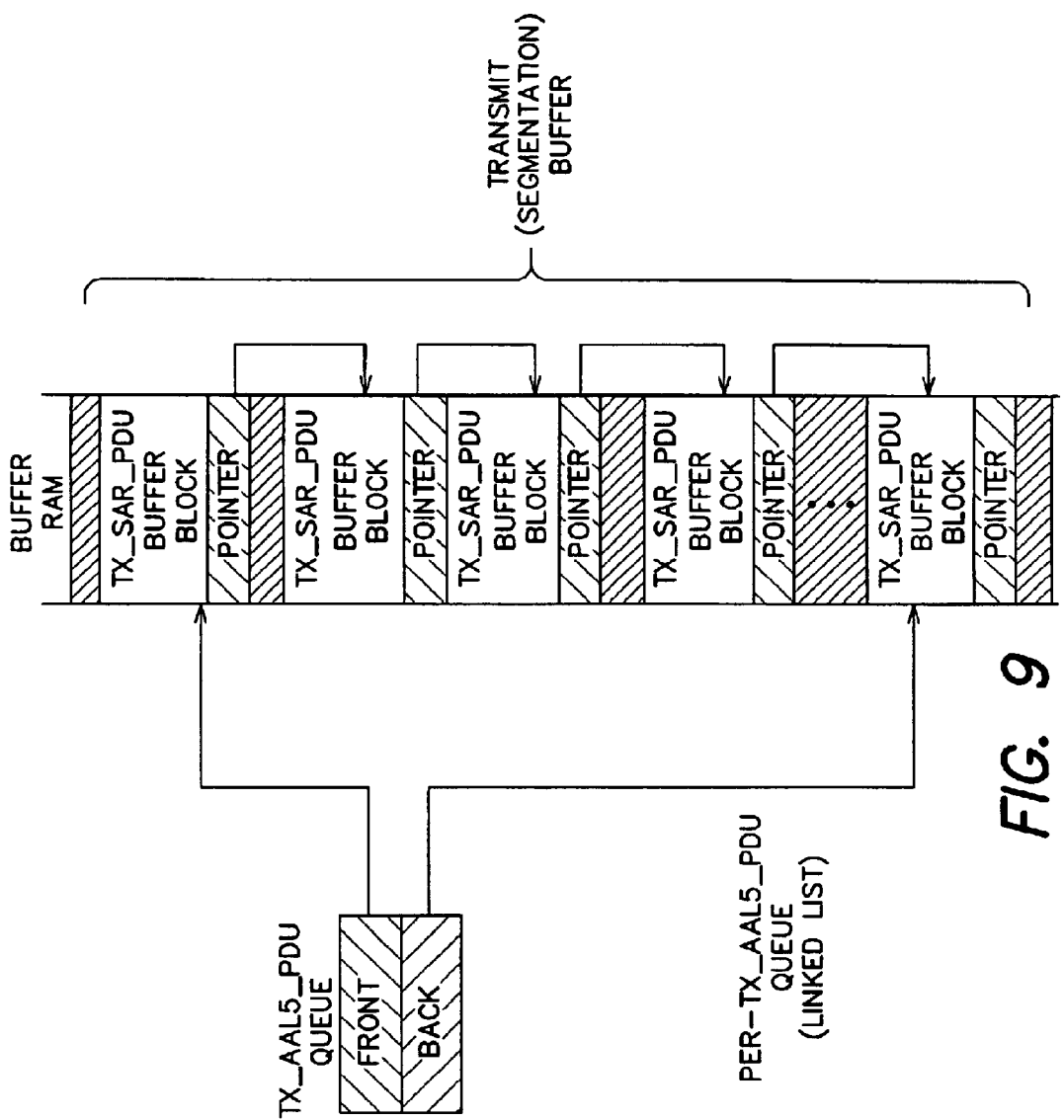
FIG. 9 shows a linked-list for data to be transmitted

The processor 12 can assign blocks of buffer memory, as described above, to each message channel that is to be received. The buffer for each PDU is composed of a series of "buffer blocks": for example, a set of buffer blocks may be approximately 1 kB each in size, so around 64 of these would be required to buffer a maximum length AAL5 PDU. The buffer blocks are preferably an integer multiple of 48 bytes in length to accommodate an integer number of ATM cells' data exactly during normal operation, easing SAR engine implementation. If the blocks are intended to hold full received cells then a size that is a multiple of 52 bytes is preferred. The buffer blocks may be of different sizes assigned by the processor, for example on the basis of the type of service that is to be received over the message channel. The blocks can be chained via a linked list (or other mechanism). Such a linked list for data to be transmitted is illustrated in FIG. 9. This shows the queue of data, each PDU having first and last block pointers. These pointers are used by the CPU to allocate the buffer blocks in the most efficient way. The "back" pointer is optional, because a similar function can be performed in software using "last block" header information. An advantage of this system is that the allocation functions are performed in software, which means the hardware is kept simple as explained above with reference to FIG. 8. Buffer allocation for incoming data is performed similarly.

Figure 10:
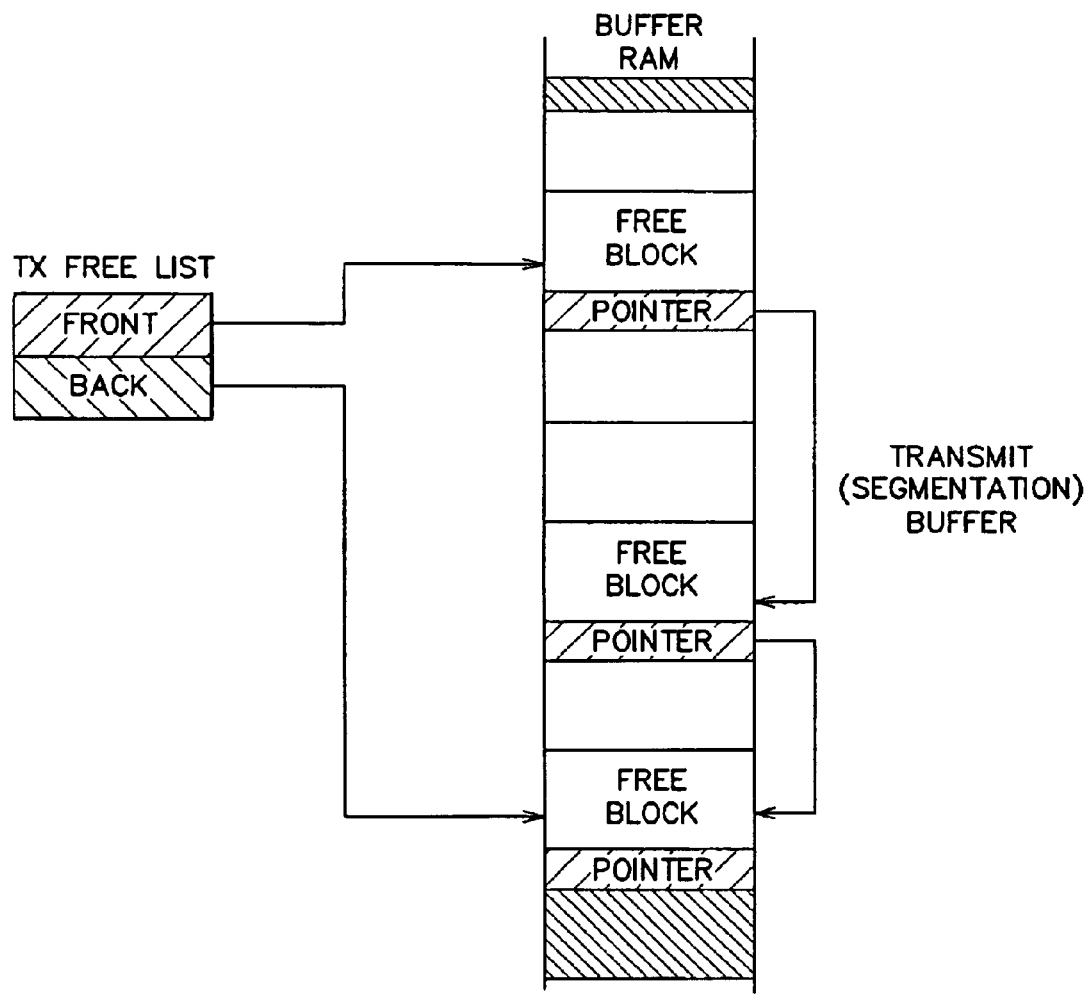
FIG. 10 shows a free-list for data to be transmitted FIG. 11 indicates a possible structure of the buffer memory in software

A "free-list" of unassigned buffer blocks is maintained by the processor 12, each of which may be chained to any of the PDU buffers to extend its size when a buffer overflow occurs. This is shown in FIG. 10 for cells to be transmitted; a similar structure is provided for incoming data.

Figure 11:
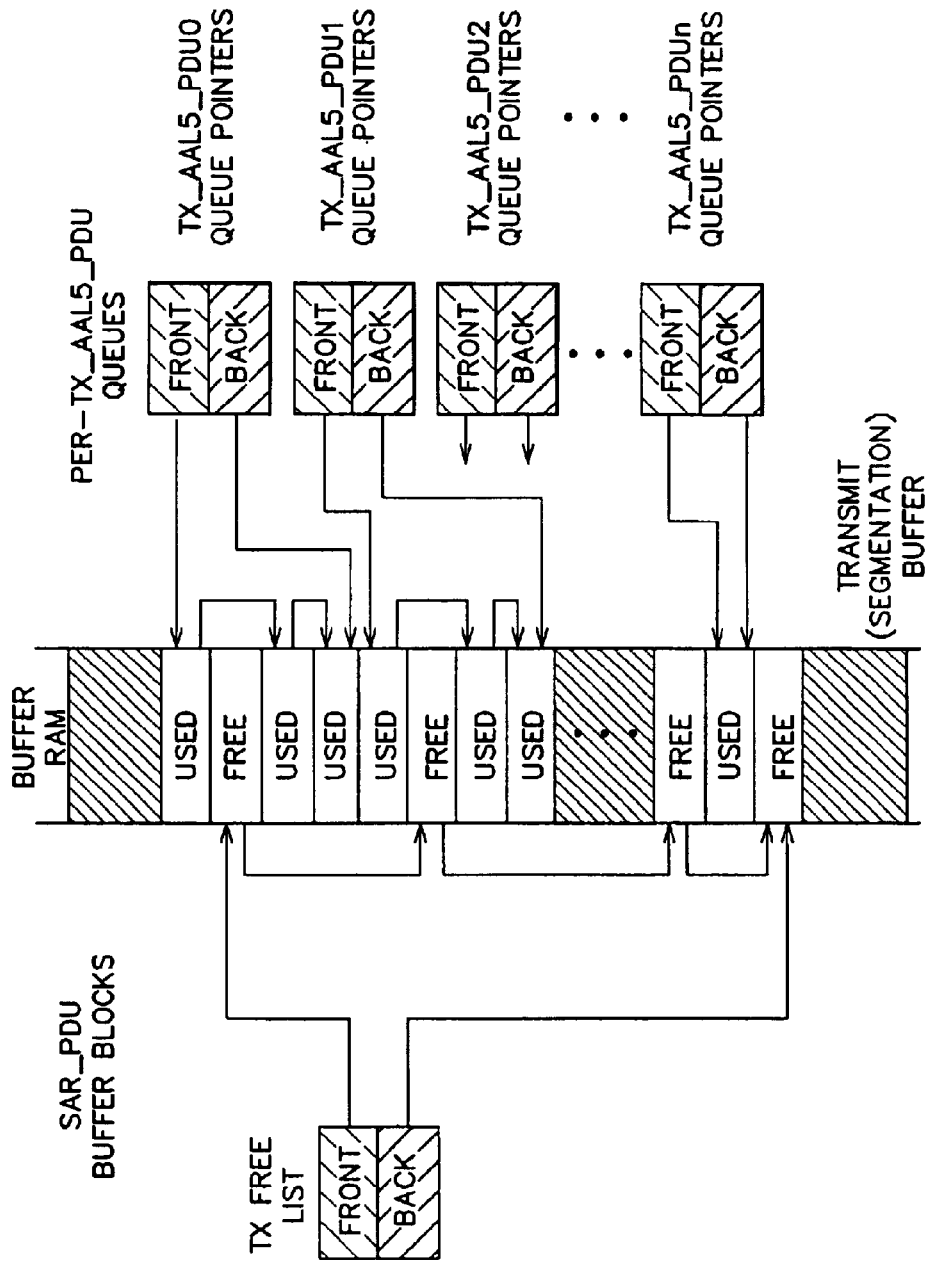

FIG. 11 shows how the buffer for cell transmission could look in practice. It shows how multiple message queues are allocated to a buffer memory in which the linked-list and free-list buffer blocks are interleaved. A similar structure could be used for incoming data.

When a message channel is first to be received the processor allocates a first buffer block to that channel, stores the length of that block in the maximum length field of the appropriate context block and stores a pointer to the base of the block in the context memory. As each cell of the message is received the current length field of the block is incremented as described above and the incremented length field is compared with the maximum length field to determine whether the end of the buffer block has been reached. If the end of the block has been reached without the last cell of the PDU having been received, i.e. the incoming PDU exceeds the current PDU buffer, the SAR engine generates an "overflow" interrupt to the CPU 12. In response the CPU 12 allocates another buffer from the free-list to the message and alters the pointer, length and if necessary the maximum length fields in the appropriate context block to reflect the new buffer block.

When a complete PDU has been received the unit that is to receive the reassembled message can retrieve the message from memory. Once the message has been retrieved the processor restores the block of memory to its list of free blocks that can be allocated.

Segmentation

In this embodiment the memory from which data is taken is the off-chip RAM 5a, but the operation is equally applicable to an on-chip memory. This off-chip RAM 5a contains a number of messages to be transmitted. The segmentation operation is essentially the reverse of reassembly, except that an ATM header needs to be added to each data cell. The other difference is that support is provided for pacing of the outgoing ATM cells in order to send them at substantially regular time intervals—this will be described in more detail below.

Figure 12:
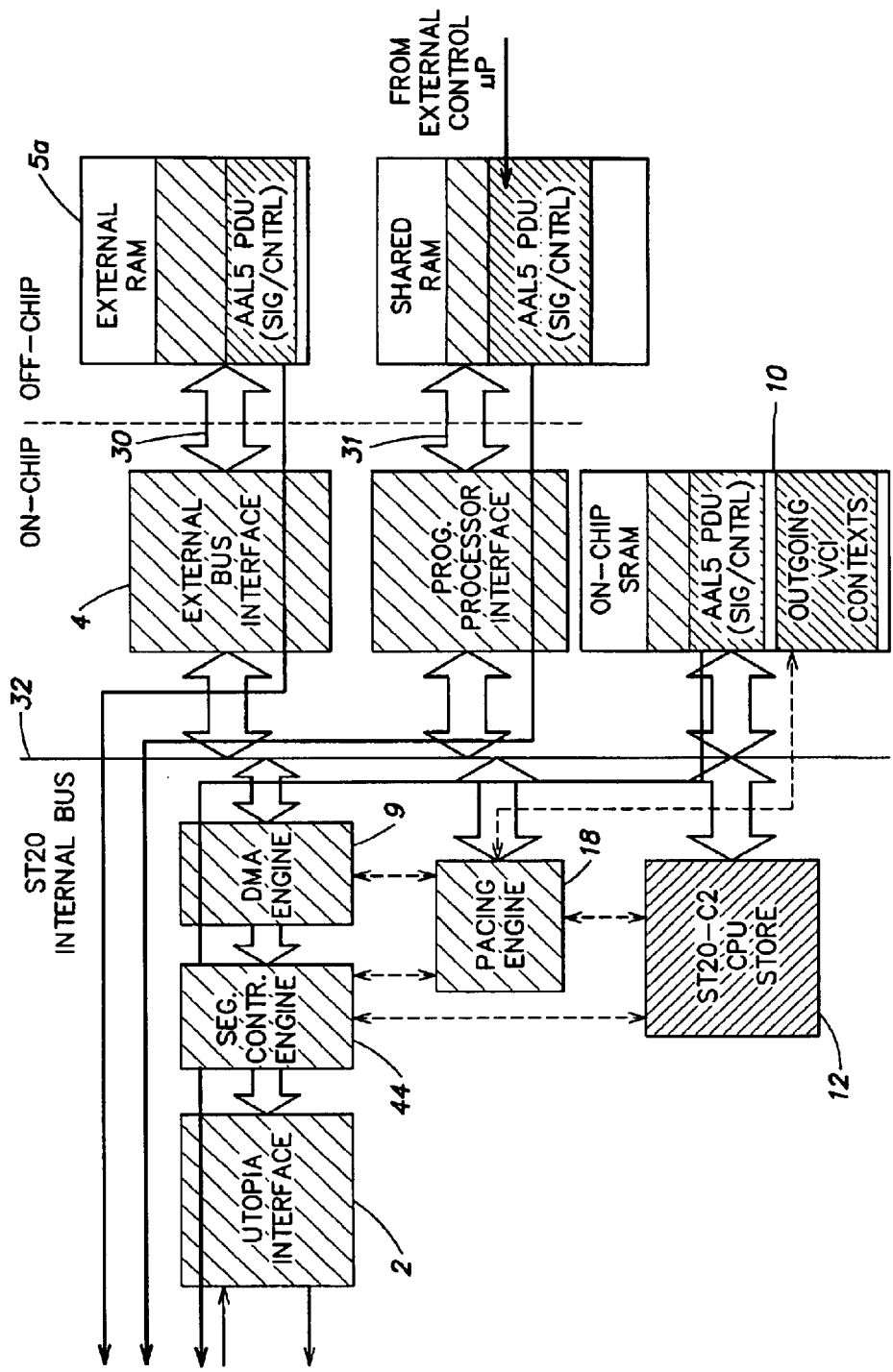
FIG. 12 shows the segmentation data structure

FIG. 12 shows the on-chip segmentation architecture of the SAR engine. The "back-end" hardware of the segmentation function comprises a pacing engine 18, a DMA engine 9 and a segmentation control engine 44.

An on-chip context memory 10 is provided as an SRAM and is used to store context information for the outgoing data stream. The context information is made up of a set of data for each message channel that is to be transmitted, indicating information that is to be used in segmenting the messages. As an alternative, the context memory could be off-chip, or it could be a different type of memory such as a DRAM.

The processor 12, the DMA engine 9 and the pacing engine 18 are linked to each other and to external bus interfaces 30,31 by an internal data bus 32. Bus interface 30 provides an interface to off-chip memory 5a, which could take various forms such as an SRAM or a DRAM.

Figure 13:
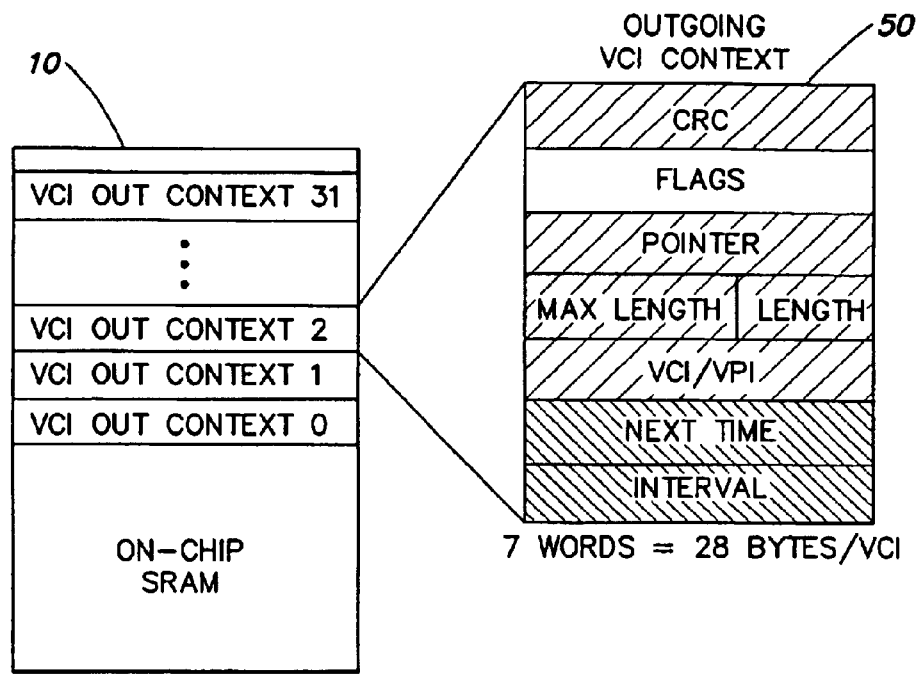
FIG. 13 shows the segmentation architecture and data flow

In operation the context memory 10 is set up under the control of the processor 12, using the internal bus 32, to hold information needed to segment each message channel that is to be transmitted. The processor allocates a block of memory in the context memory 10 to hold context information for use in segmenting cells of that message. The processor also allocates storage buffer memory, either in the memory 10 or in another memory (for example off-chip memory) to transmit the outgoing data. In the allocated block in the context memory 10 the following information, which is illustrated at 50 in FIG. 13, is held:

a current running CRC
some flags
a pointer to the current position in the PDU
a current and maximum length for the PDU
VPI/VCI header information
a next transmission time
a transmission interval The pointer and PDU lengths aid buffer management, and the transmission time and interval are used by the pacing engine for the scheduling of ATM cell transmission to the physical layer (described below).

The processor stores initial values for each of these into the allocated block in the context memory.

Within the segmentation engine there are a number of registers which control or indicate the status of various functions, which are described in more detail below. One of these is the Current Segmentation register. This is written to by the pacing engine and can be read by the CPU, and indicates the context that is currently being used by the pacing engine, i.e. the message currently being sent. The segmentation engine takes a portion of data (48 bytes in size) from the RAM 5a, and VPI/VCI identification and other cell header information is prepended to it, thereby forming an ATM cell of 53 bytes in length. This cell is then read by the DMA engine and transmitted by the segmentation engine via the UTOPIA port.

Once the DMA engine has transmitted the data it increments the pointer in the context identified by the start address by 48 bytes and updates the CRC. This allows the next piece of data of the same message to be taken from the correct location. The DMA engine also increments the length in the context identified by the start address by 48 bytes. Of course, if a different protocol were being used, other cell sizes could be processed, and the incrementing of the pointer and length information altered accordingly.

An analogous memory management protocol is used for segmentation to that used for reassembly. In the segmentation memory management protocol the CPU receives an indication of data such as a file that is to be transmitted. This could be stored in memory on or off chip. The CPU then allocates one or more buffers preferably in on-chip memory for use in transmitting the file. The CPU loads the first data from the file into the first buffer and subsequent data into any subsequent buffers. Then the CPU sets up a context with the details (including the address and size) of the first buffer from which transmission of the file is to be performed, and causes the segmentation to begin transmission. The segmentation engine then transmits cells of data from that buffer one-by-one as specified by the context. When the buffer is exhausted (i.e. when the pointer to the next data to be transmitted reaches the address of the end of the buffer) the segmentation engine checks whether a flag in the context is set to indicate that the end of the file has been reached. If it has not then the segmentation engine transmits a signal to the CPU to inform it that the buffer is exhausted. If there is another buffer of data from the file ready to send then the CPU configures the context to specify that buffer to allow the segmentation engine to resume transmission. If there is no buffer of data ready to send then the CPU stores the next data from the file in a new or a different buffer and then configures the context to specify that buffer to allow the segmentation engine to resume transmission. If the buffer specified by the context is the final buffer of data for a file then the CPU sets the flag in the context to indicate that the end of the file has been reached. By keeping at least two buffers allocated to the file the CPU can avoid delaying transmission whilst the segmentation engine waits for it to transfer data to a buffer. (The segmentation engine could, however, send data from other files in the meantime). As for reassembly, the CPU maintains a list of free buffers or buffer space to allow it to allocate buffers efficiently. As for reassembly one aim of the memory management protocol is to substantially minimise or at least reduce memory usage. This is achieved by the flexible buffering system, including the ability to have buffers or pools of buffers of different sizes that can be allocated depending on the size or transmit rate of a file to be transmitted. The "file" could be any suitable data structure.

Pacing Engine

The pacing engine, if enabled, acts to select a message channel that is to supply the next data to be transmitted. It does this by using the "next time" and "valid bit" fields stored in the context memory blocks for active outgoing message channels (for an explanation of the fields, see below).

The "next time" fields indicate the next time (in relation to a clock maintained by the pacing engine) at which it is intended that data should be transmitted from the respective message channel. The interval fields indicate the intended inter-cell interval with respect to the pacing engine clock between successive transmissions from the respective message channel. The interval therefore determines the effective bit-rate for the message channel. Preferably no interval should be less than a cell time. Also the sum of the bit-rates for all active message channels should not exceed the bandwidth of the port. If the number of active message channels n, the interval for the ith message channel is $I_i$ and $T_c$ is the cell time, then this constraint can be written:

$$\sum_{i=1}^{n} (I_i)^{-1} \le \frac{1}{T_c}$$

Software executed by the processor 12 is responsible for ensuring that the sum of the interval values is not less than the number of active message channels multiplied by one cell time.

The pacing engine maintains a "current time" clock. At programmable time intervals, for example every 10 µs, it scans all the context memory blocks for outgoing message channels to identify the context whose "next time" field indicates the earliest time at or before the "current time", i.e. the one which is most overdue for transmission. If none of the stored "next times" is at or before the current time then an idle cell may or may not be sent. Otherwise the pacing engine selects for transmission the message channel whose context has the earliest "next time". It should be noted that the physical layer at the external side of the UTOPIA port can be set up to send idle cells, in which case an idle cell transmission would not need to be initiated by the pacing engine.

Each time a non-idle cell is sent, the "next time" field of the context memory block corresponding to the message channel from which the message was sent is incremented by the "interval" value stored in that block. The pacing engine also determines whether at that time the length stored in that block equals the stored maximum length, and the "last block" flag in the flags for that block is not set—this would indicate that the processor must now update the context memory to refer to a new block of memory so that more data can be sent. To signal this to the processor the pacing engine sets the "next time" field to an invalid value and signals an interrupt to the CPU 12. The memory management system implemented by the processor is then responsible for providing the next block of data and setting the "max length", "next time" and "pointer" fields and any flags required. When the last block of the message is scheduled for transmission, the "last block" flag is set. When the pacing engine encounters a "last block" flag, and the length equals the max length, it causes a final cell including the calculated CRC to be inserted (if configured to do so) in the CRC field of the last cell.

As previously mentioned, the "next time" field of each context can be used to allow the processor 12 to render each context active or inactive. Contexts can be rendered active by setting the valid bit in the next time field. If all contexts have next time values which are not valid, or later than the current time, only idle cells will be transmitted (if this function is enabled).

By varying the time intervals associated with the different contexts, different bandwidths can be allocated to the corresponding message channels. Pacing can therefore be implemented on a per-message-channel basis by setting the times and intervals of the message channels as desired.

In some circumstances it may be necessary to have direct control over the time at which cells are to be transmitted. To achieve this the processor 12 can disable normal selection of message channels by the pacing engine and can instead insert messages itself for transmission, which results in the message being sent immediately.

The outgoing context contains two fields used in the pacing operation: NextTime and Interval. The NextTime field indicates the time at or after which a cell from that context is due to be sent. The Interval field indicates the intended interval between the transmission of successive cells from the data stream corresponding to the context. In normal operation, at each tick of the pacing clock the pacing engine checks the NextTime fields of the contexts, sends a cell from the context with the earliest value in the NextTime field and then increments that NextTime field by the stored Interval for that context.

Register Map

Figure 14:
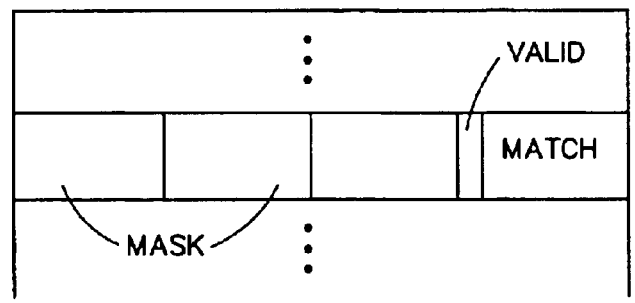
FIG. 14 illustrates the structure of the content addressable memory.

The details of the register map of the system will now be described. The following registers are available:

The Content Addressable Memory appears to the main processor 12 as a peripheral located in the memory map of the processor. The CAM is 32 entries deep, each entry consists of four words. However not all the bits in the word are used in each entry. The structure of the CAM is illustrated in FIG. 14. Each entry in the CAM comprises four words. One word holds the match value that is to be compared with the VCINPI data from cell headers. One bit of the next word indicates whether the entry is valid for current use. The other two words hold the mask data for the entry. All locations in the CAM should preferably be initialised by the processor before enabling the reassembly engine. The size of the CAM is the limiting factor for the number of channels that can be handled directly in hardware. However, the size of the CAM is not limited to 32 entries or 4 words and could be larger or smaller.

Header Match register contains the ATM cell header being matched against the CAM. This can be used to access the header information for the current cell being processed.

Valid Match register contains the upper 32 bits (valid bit) for a CAM entry whose header matches. This can also be used to access the header information for the current cell being processed.

Match Line register contains the results of the match between the incoming header and the contents of the CAM. Each bit corresponds to a single match line in the CAM, bit 0 to Cam entry 0, bit 1 to entry 1 etc.

Segmentation Control register is a 32 bit register which can be read from or written to. It contains four functional fields:

| Functional Field | Function |
| --- | --- |
| StartSegmentation | When set informs the segmentation engine to start. If de-asserted whilst the segmentation is operating the current transfer will be completed before the segmentation engine is disabled. |
| EnablePacingEngine | Enables the pacing engine |
| EnablePacingClock | Enables the pacing clock |
| IdleCellGeneration | Send idle cell when no valid context is ready to be sent |

ReassemblyControl register is a 32 bit register which can be read from or written to. It also contains four functional fields:

| Bit Field | Function |
| --- | --- |
| StartReassembly | Informs the reassembly engine to start |
| EnableIdleCellRemoval | Enable transparent removal of idle cells |
| ErrantCellControl | Define the behaviour of the reassembly engine on detecting a cell which has no match in the CAM |

The ErrantCellControl field has four states:

Delete all errant cells

Move the complete cell including the four bytes of header to the context referenced by the Reassembly ErrantCellStartAddress. This allows the CPU to group unrecognised cells before processing them reducing the overhead required to process large number of unrecognised cells Copy the four bytes of the header to the buffer pointed to by ReassemblyErrantCellStartAddress and set NoMatchInCam bit. The cell is not deleted in this mode but held in the fifo. It will be re-presented to the CAM on clearing the interrupt.

Transfer cell including the four bytes of header to ReassemblyErrantCellStartAddress and set NoMatchInCam bit. The cell is moved to memory and removed from a FIFO buffer in the transfer path, therefore the next cell to be processed will be a new cell.

Segmentation Context Start Address is the address to use as the pointer to the start of the segmentation contexts Reassembly Context Start Address is the address to use as the pointer to the start of the reassembly contexts Interrupt Enable register allows control over the interrupt functions and has the following fields:

| Bit Field | Function |
| --- | --- |
| OnNoMatchInCam | Raise an interrupt when header fails to match a CAM entry in order to re-present to the CAM on clearing of the interrupt. If clear then process cell as erroneous or idle |
| OnSingleMatchInCam | Raise an interrupt when a cell header matches a single CAM entry. If clear then use CAM to generate context and process cell |
| OnMultipleMatchesInCam | Raise an interrupt when more than one CAM entry matches header |
| OnCellAvailable | Raise an interrupt when a cell is available. If clear process cell as indicated by CAM |
| OnCellCorrupt | Raise an interrupt when a corrupt cell has been received from the physical (UTOPIA) layer. If clear then delete cell without interrupt. |
| OnCellError | Raise an interrupt when an error condition has occurred whilst transferring this cell. Reassembly controls the operation ad behaviour. If clear then transfer cell without interrupt. |
| OnSarPduBufferOverFlow | Raise an interrupt when PDU buffer is full and unable to accept current cell. |
| OnPduComplete | Raise an interrupt when a complete PDU has arrived. |
| OnReassemblyCrcError | Raise an interrupt when a reassembly CRC check failed. |
| OnReassemblyPduError | Raise an interrupt when a PDU related error condition has occurred |
| OnReadyToSendCell | Raise an interrupt if pacing engine indicates ATM stream is ready to accept cell. If clear the continue normal operation |
| OnPduBufferExhausted | Raise an interrupt when a segmentation buffer has been consumed |
| OnSegmentationCompleted | Raise an interrupt when the final PDU cell has been sent |
| OnSegmentationError | Raise an interrupt when an error occurs during segmentation. |

Interrupt Status register reflects the state of the interrupts and, if enabled in the InterruptRegisterEnable, allows the processor to determine the cause of an interrupt. The processor then writes back to the register to clear the interrupt.

The areas are as follows:
NoMatchinCam
SingleMatchInCam
MultipleMatchesInCam
CellAvailable
CellCorrupt
CellError
SarPduBufferOverFlow
PduComplete
ReassemblyCrcError
ReassemblyPduError
ReadyToSendCell
PduBufferExhausted
SegmentationCompleted
SegmentationError Reassembly Errant Cell Start Address register contains the pointer to the location in which an errant cell or unmatched cell is stored for further use by the processor, if required. This register can also be used to point to a context used by the processor for handling cell streams itself.

Current Reassembly Context register contains information concerning the channel currently being reassembled and has fields as follows:

| Bit Field | Function |
| --- | --- |
| TransferInProgress | This is set when the cell transfer is in progress. It is clear when reassembly engine is idle |
| CurrentReassemblyContextAddress | Address of context that is being used by the reassembly engine |

Current Segmentation Context register contains information concerning the channel currently being segmented and has fields as follows:

| Bit Field | Function |
| --- | --- |
| TransferInProgress | This is set when the cell transfer is in progress. It is clear when segmentation engine is idle |
| CurrentSegmentationContextAddress | Address of context that is currently being used by the segmentation engine |

Current Segmentation Time is the current absolute time used by the SAR engine.

Number of Outgoing Contexts register is the number of outgoing contexts to be used by the segmentation engine, which is set to a default of 32 in this embodiment, but can be programmed to be other values as required.

Next Segmentation Context Address register is used when a transfer is to be made by the engine and the pacing engine is disabled. The register CurrentSegmentationContextAddress is set by the CPU to point to the address of the context from which a cell is to be transmitted. The bit TransferInProgress, is set to enable the transfer by the processor. When the transfer is in progress the TransferInProgress bit is set. When the transfer is complete the TransferInProgress bit is unset.

Pacing Clock Control register allows control of the pacing clock. PacingClockPeriod defines the period of the pacing clock as a multiple of the system clock period. This implicitly defines the resolution of the pacing function and the time contained within the context. PacingInterval is the number of pacing clock periods which need to occur before the pacing function examines the context to determine if another cell should be sent. The available fields are as follows:

| Bit Field | Function |
|---|---|
| PacingClockPeriod | Sets the period of the pacing clock as a multiple of system clock cycles |
| PacingInterval | Sets the pacing interval period as a multiple of the pacing clock |

Contexts

Each set of contexts is located in a contiguous area of memory. The memory may be in internal memory, external memory or indeed the shared memory. The SAR is told the base of each block of contexts by writing to the appropriate ContextStartAddressregister (described in the previous section). This section describes the layout of the contexts and gives the meanings to any attributes within the contexts.

Each incoming context (used for reassembly) looks as follows:

| Field | Function |
|---|---|
| CRC | Running CRC value used by the Reassembly engine |
| Flags | Flags used to direct behaviour and report status |
| BufferPointer | Pointer to the next free buffer area. |
| MaximumAndCurrentLength | Current length and maximum length word |

The MaximumAndCurrentLength field is structured as follows:

| Bit Field | Function |
|---|---|
| MaximumLength | Amount of buffer space in total pointed to by BufferPointer |
| CurrentLength | Amount of data that has been currently transferred to the buffer area |

The CRC field contains either a 10-bit CRC for data streams such as OAM, RM, AAL3/4 or a 32-bit CRC for AAL5 streams, as defined by the ATM Forum and other standards. These two modes of error checking require different initial and final values to be set, the final value being that expected if the CRC check has succeeded. If the CRC is not enabled for this context, the contents of this field are not defined, updated or used by the engine.

The Buffer Pointer points to the next word in memory that the reassembly engine will access when transferring an ATM stream. It may point to any location in memory.

The flags used are as follows:

| Bit Field | Function |
|---|---|
| IgnorePayload | Ignore the payload |
| EnableCrcCheck | Enable CRC checking |
| CRC32CRC10 | If set use a 32 bit CRC otherwise use a 10 bit |
| PTIEqualsLength | If set the PTI in the ATM header will indicate the end of PDU else Maximum-Length indicates size of PDU. |
| LimitedUpdate | If set then update only Flags field. |
| DisablePduEvents | If set then do not raise interrupts for PduComplete, PduBuffer-Overflow or ReassemblyPduError. |
| ContextValid * | If set then the context was valid when a cell was last transferred. |

-continued

| Bit Field | Function |
|---|---|
| ContextFull * | If set then the buffer has been filled. |
| ContextComplete * | If set then the transfer of the PDU to the buffer has completed. |
| ContextCrcError * | If set then a CRC check has failed for this context |
| ContextError * | If set then an error has occurred in this buffer. This means CurrentLength is greater than MaximumLength. |
| PHYAddress | Address of the PHY device from which the last cell was transferred |

* Status bits maintained by engine

Each outgoing context (used for segmentation) is as follows:

| Field | Function |
|---|---|
| CRC | Running CRC value used by the Segmentation engine |
| Flags | Flags used to direct the behaviour and report status |
| NewTime | The next absolute time to output a cell |
| Interval | Time interval to add to NewTime after a cell using this context has been transmitted |
| VCI/VPI | Header prepended to each cell prior to transmission |
| BufferPointer | Pointer to the buffer containing the PDU |
| MaximumAndCurrentLength | Current length and maximum length word |

The MaximumAndCurrentLength field is structured as follows:

| Bit Field | Function |
|---|---|
| MaximumLength | Size of (partial) PDU in current buffer pointed to by BufferPointer |
| CurrentLength | Amount of data that has been transmitted |

The segmentation CRC field used for outgoing contexts is in a similar format to that of the reassembly CRC, containing either a 10-bit CRC for streams such as OAM, RM, AAL3/4 or a 32-bit CRC for AAL5 streams, as defined by the ATM Forum and other standards. These two modes of error checking require different initial and final values to be set, the final value being that expected if the CRC check has succeeded. If the CRC is not enabled for this context, the contents of this field are not defined.

The Buffer Pointer points to the next word in memory that the segmentation engine will access when transferring an ATM stream. It may point to any location in memory.

The flags used for segmentation are as follows:

| Bit Field | Function |
|---|---|
| LastBlock | The PDU pointed to by Buffer-Pointer is the final one |
| EnableCrc | Insert a CRC in the Final cell |
| CRC32CRC10 | If set then perform a 32bit CRC else a 10 bit CRC |
| InsertPTI | Updates PTI in the cell header for final cell |
| LimitedUpdate | If set then the segmentation engine will only update the Flags and NewTime fields in this context |
| DisablePduEvents | If set then do not raise interrupts for SegmentationCompleted PduBufferExhausted or SegmentationError. |

-continued

| Bit Field | Function |
|---|---|
| PHYAddress | Address of the PHY device to which the last cell was transferred |
| PduValid * | The context associated with PDU is valid |
| BufferExhausted * | The PDU in the buffer has been consumed and more is expected |
| PduComplete * | The segmentation of the PDU pointed to by BufferPointer has been completed |
| Error * | An error has occurred using this context. This means CurrentLength is greater than MaximumLength |

* Status bits maintained by engine

Overview

An important advantage of the SAR engine is that the implementation of some functions in hardware and other functions in software allows a device to be made with a relatively small die area and relatively high performance. It is preferred that the following functions are performed in hardware: checksum calculation, identification of ATM headers (suitably by means of a CAM for reassembly), DMA functions to and from memory, pacing of upstream ATM cell transmission on a per-VC basis, and handling of interrupts and control interfaces to an on-chip CPU core. It is preferred that the following functions are performed in software by means of the on-chip CPU core: memory management and buffering strategy for ATM cells, AAL5 Protocol Data Units (PDU), MPEG transport streams and other data i.e. memory management for a variety of messages; and RM cell processing and other functions in support of ABR modes of operation.

The apparatus as described above is especially suitable for implementation by an embedded microprocessor with appropriate software or firmware. This means that the data structure can be made completely generic—for example, buffers with a length of a single cell can be allocated, so as to reduce fragmentation of memory. Software running of the microprocessor can implement any desired management scheme.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

What is claimed is:

1. Data reception apparatus for receiving data from a plurality of data streams sent over a data channel, the apparatus comprising:
    a data memory for storing the received data;
    a data storage control memory for storing, for each data stream, a definition of a corresponding storage block in the data memory, the storage blocks, for the respective data streams being capable of being of different lengths;
    a data storer for identifying in the data received on the data channel amounts of data and the data stream from which each amount of data is sent, accessing the data storage control memory to determine the storage block corresponding to the said data stream, storing that amount of data in the storage block corresponding to the said data stream and, if no more amounts of data can be stored in that storage block, generating a block full indication for that block; and
    a memory controller responsive to the block full indication for the storage block to allocate to the data stream corresponding to that storage block another storage block in the data memory by storing, for that data stream, a definition of the other storage block in the data storage control memory.

2. Data reception apparatus as claimed in claim 1, wherein the data storer is provided by dedicated circuitry on an integrated circuit.

3. Data reception apparatus as claimed in claim 1, wherein the memory controller is provided by the central processing unit of an integrated circuit.

4. Data reception apparatus as claimed in claim 1, wherein the data storer and the memory controller are each provided by separate processing circuitry, the separate processing circuitry of the data storer and the memory controller being formed on a same integrated circuit.

5. Data reception apparatus as claimed in claim 2, wherein at least part of the data memory is on the integrated circuit.

6. Data storage apparatus as claimed in claim 1, wherein at least some of the storage blocks are contiguous sets of memory locations.

7. Data reception apparatus as claimed in claim 6, wherein the said definition of a storage block comprises an end memory address and a length of the storage block.

8. Data reception apparatus as claimed in claim 6, wherein the storage blocks are of differing sizes.

9. Data reception apparatus as claimed in claim 8, wherein the memory controller is provided by a central processing unit of an integrated circuit and the differing sizes of the storage blocks are programmable under software control by the central processing unit.

10. Data reception apparatus as claimed in claim 8, wherein the differing sizes of the storage blocks are dynamically changeable during operation of the apparatus.

11. Data reception apparatus as claimed in claim 1, wherein the data storage control memory stores first error check information for at least one of the data streams and on receiving an amount of data from that data stream the data storer performs an error check calculation using the first error check information and the contents of the amount of data to calculate second error check information and stores the second error check information in the data control memory to replace the first error check information.

12. Data reception apparatus as claimed in claim 1, wherein the data storer generates the block full indication after receiving an amount of data that can not be stored in the storage block.

13. Data reception apparatus as claimed in claim 12, wherein if the data storer determines that an amount of data can not be stored in the storage block and that amount of data is a final amount of data of a message it generates a block full indication of a second type, in response to which the memory controller allocates a smaller storage block for the data stream.

14. Data reception apparatus as claimed in claim 1, wherein the memory controller maintains a list of storage blocks available for allocation.

15. Data reception apparatus as claimed in claim 1, wherein the data storage control memory stores for each data stream an indication of a location in the data memory at which the data storer is to store the next-received amount of data for that data steam.

16. Data reception apparatus as claimed in claim 1, wherein the data memory is provided by at least two discrete memory units.

17. Data reception apparatus as claimed in claim 1, wherein the amount of data is 384 bits.

18. Data reception apparatus as claimed in claim 1, wherein each amount of data is received in the form of an ATM cell.

19. Data reception apparatus for receiving data from a plurality of data streams sent over a data channel, the apparatus comprising:

a data memory for storing the received data;

a data storage control memory for storing, for each data stream, a definition of a corresponding storage block in the data memory, the storage blocks for the respective data streams being capable of being of different lengths;

a data storer for identifying in the data received on the data channel amounts of data and the data stream from which each amount of data is sent, accessing the storage control memory to determine the storage block corresponding to the data stream, storing that amount of data in the storage block corresponding to the data stream and, if no more amounts of data can be stored in the storage bock, generating a block full indication for that block; and a memory controller responsive to a block full indication for a storage block to allocate to the data stream corresponding to that storage block another storage block in the data memory by storing, for that data stream, a definition of the other storage block in the data storage control memory;

wherein if the data storer determines that an amount of data can not be stored in the storage block and that amount of data is a final amount of data of a message it generates a block full indication of a second type, in response to which the memory controller allocates a smaller storage block for the data stream.

20. Data reception apparatus as claimed in claim 11, wherein after receiving a last amount of data from the at least one of the data streams, the data storer performs another error check calculation using the second error check information and error check information transmitted with the last amount of data to determine whether the second error check information matches the error check information transmitted with the last amount of data.

* * * * *